Patented July 25, 1933

1,920,053

UNITED STATES PATENT OFFICE

HARRY P. BASSETT, OF CYNTHIANA, KENTUCKY, AND JEWETT C. SIMONS, OF PHILADELPHIA, PENNSYLVANIA, ASSIGNORS TO MEIGS, BASSETT & SLAUGHTER, INC., OF PHILADELPHIA, PENNSYLVANIA, A CORPORATION OF PENNSYLVANIA

PROCESS OF MAKING COPPER HYDROXIDE

No Drawing. Application filed June 17, 1930. Serial No. 461,848.

This invention relates to a process of making copper (cupric) hydroxide and more particularly to a process of making copper hydroxide which is particularly adapted for use in preparing cuprammonium solutions for use in the manufacture of artificial silk and the like.

The principal object of this invention is to provide a process of making copper hydroxide in extremely pure condition.

A further object of the invention is to provide a process of making copper hydroxide which is particularly adapted for use in preparing cuprammonium solutions for use in the manufacture of artificial silk and the like.

Other objects and advantages of the invention will become apparent during the course of the following description.

According to one of the most generally used processes of making copper hydroxide, copper sulfate is mixed with sufficient caustic soda to react with the copper salts and provide a solution which is substantial neutral or only slightly alkaline. The precipitate which forms is fitered for use. While this is a simple method of making copper hydroxide, the resulting product ordinarily contains from 15 to 20% of basic copper salts with the result that it is too impure for certain purposes such as in the manufacture of artificial silk according to the cuprammonium process. A further disadvantage of the product for use in the artificial silk industry is that there is a waste of copper in the process due to the fact that the copper of the basic copper sulfate is not in an active condition to form a cuprammonium solution with ammonia. Moreover, the presence of basic copper sulfate in a cuprammonium spinning solution is detrimental as it clogs up the spinnerettes.

In the present process of making copper hydroxide which is particularly adapted for use in preparing cuprammonium solutions, a concentrated copper sulfate solution is reacted with an excess of caustic alkali at a temperature below 10° C. In the preferred practice of the process, an aqueous solution of copper sulfate in as concentrated condition as possible without crystallization is mixed with from 105 to 120%, and preferably 110%, of the theoretical reacting amount of caustic soda in solution. While caustic soda is preferred for use, other caustic alkalies, such as potassium hydroxide, may be employed. As stated, the caustic alkali is used in solution, the strength of which may be varied, although we prefer to employ a 20% NaOH solution. The purpose of the excess of caustic alkali entering into the reaction is to split up the basic copper sulfate which is formed.

As indicated, the reaction should be conducted at a temperature below 10° C. Sub-zero temperatures may be employed but we have found that a temperature around 2 to 4° C. is generally most advantageous. The purpose of the low temperature is to facilitate the settling of the copper hydroxide formed. We have found that the use of a reduced temperature results in the formation of larger and heavier particles of copper hydroxide which more readily settle than the particles formed when the reaction is conducted at a higher temperature.

After the reaction, care should be taken to collect the copper hydroxide promptly. For example, if the mass is allowed to stand for several hours, say 6 hours, the copper hydroxide formed breaks down into the brown cuprous oxide. Accordingly, we have found it advantageous to hasten the settling of the copper hydroxide by adding a settling agent to the mass. While various settling agents may be employed it is advisable to select one which will not substantially react with the copper hydroxide and which will not be detrimental to the silk when the copper hydroxide is to be employed in the preparation of cuprammonium solutions for use in the manufacture of artificial silk. Coagulating agents such as glucose or common soap, or agents which lower the surface tension of the solution, such as ethyl alcohol or glycerine may be advantageously used as settling agents in the practice of the process. We prefer to employ glucose and when this material is used we add the glucose to the mass in the proportions of approximately 1/10 of 1% on the weight of the copper hydroxide present.

After the addition of the settling agent, the mass is allowed to stand until the copper hydroxide has settled. This ordinarily requires about two hours. Thereafter the supernatant liquid is drawn off and the precipitate is washed with water, preferably by mixing water with the precipitate and stirring. While the resulting copper hydroxide is comparatively pure, it is advisable to let the mass stand again for approximately two hours, draw off the supernatant liquid, and again wash. In the particular embodiment to which we have put the present invention, the settling and washing may be conducted any number of times in order to assure the absence of water soluble impurities in the final product. After the final washing, the product is filtered and dried, after which it is ready for use, but also may be used in undried form.

While we have described in detail the preferred practice of our process it is to be understood that the details of procedure may be variously modified without departing from the spirit of the invention or the scope of the subjoined claims.

We claim:

1. The herein described process of preparing copper hydroxide which comprises mixing at a temperature below 10° C. an aqueous solution of copper salt with from 105 to 120% of the theoretical reaction amount of an alkali metal hydroxide in solution, immediately adding glucose to the mass, allowing the mass to stand to permit the copper hydroxide to settle, and separating and washing the precipitated copper hydroxide.

2. The herein described process of preparing copper hydroxide which comprises mixing at a temperature of approximately 2 to 4° C. an aqueous solution of copper salt with an excess of the theoretical reacting amount of an alkali metal hydroxide in solution, immediately adding glucose to the mass, allowing the mass to stand to permit the copper hydroxide to settle, and separating and washing the precipitated copper hydroxide.

3. The herein described process of preparing copper hydroxide which comprises mixing at a temperature of approximately from 2 to 4° C. an aqueous solution of copper salt with approximately 110% of the theoretical reacting amount of an alkali metal hydroxide in solution, immediately adding glucose to the mass, allowing the mass to stand to permit the copper hydroxide to settle, and separating and washing a plurality of times the precipitated copper hydroxide.

HARRY P. BASSETT.
JEWETT C. SIMONS.